United States Patent [19]

Jacob

[11] Patent Number: 5,468,932
[45] Date of Patent: Nov. 21, 1995

[54] METHOD OF GENERATING A PATTERN IN THE SURFACE OF A WORKPIECE

[75] Inventor: Heinz J. Jacob, Norderstedt, Germany

[73] Assignee: U.S. Philips Corporation, New York, N.Y.

[21] Appl. No.: 168,701

[22] Filed: Dec. 16, 1993

Related U.S. Application Data

[63] Continuation of Ser. No. 23,255, Feb. 25, 1993, abandoned.

[30] Foreign Application Priority Data

Feb. 27, 1992 [DE] Germany ............... 42 06 002.8

[51] Int. Cl.⁶ .................................................. B23K 26/14
[52] U.S. Cl. ........................................ 219/121.69; 378/132
[58] Field of Search ..................... 219/121.6, 121.67, 219/121.68, 121.69, 121.72, 121.84, 121.85; 378/128, 132, 133, 127, 143, 144

[56] References Cited

U.S. PATENT DOCUMENTS

| 5,077,775 | 12/1991 | Vetter ............... | 378/132 |
| 5,204,890 | 4/1993 | Anno et al. ......... | 378/133 |
| 5,224,142 | 6/1993 | Ono et al. .......... | 378/128 |
| 5,248,658 | 9/1993 | Yamazaki ........... | 219/121.85 |

FOREIGN PATENT DOCUMENTS

| 2590823 | 6/1987 | France ............... | 219/121.84 |
| 3900730 | 7/1990 | Germany . | |
| 3930573 | 3/1991 | Germany . | |
| 56-105479 | 8/1981 | Japan . | |
| 61-202440 | 9/1986 | Japan . | |

OTHER PUBLICATIONS

Chemical Abstracts, vol. 105, 1986 p. 250, No. 101399.

Primary Examiner—Geoffrey S. Evans
Attorney, Agent, or Firm—Edward Blocker

[57] ABSTRACT

The invention relates to a method of generating a pattern of depressions in the surface of a workpiece, in particular one made of molybdenum or a molybdenum alloy for rotary-anode X-ray tubes. Such a method can be arranged in a more inexpensive and/or more environmentally friendly manner in that the workpiece is heated spotwise by a laser beam, the heating spot being directed over the surface in accordance with the pattern of depressions, in that a jet of oxygen is directed at the heating spot, and in that the energy supply to the heating spot is so controlled that the melting temperature of the workpiece material is not reached, while nevertheless the sublimation temperature of the oxide formed by the heating is exceeded.

4 Claims, 1 Drawing Sheet

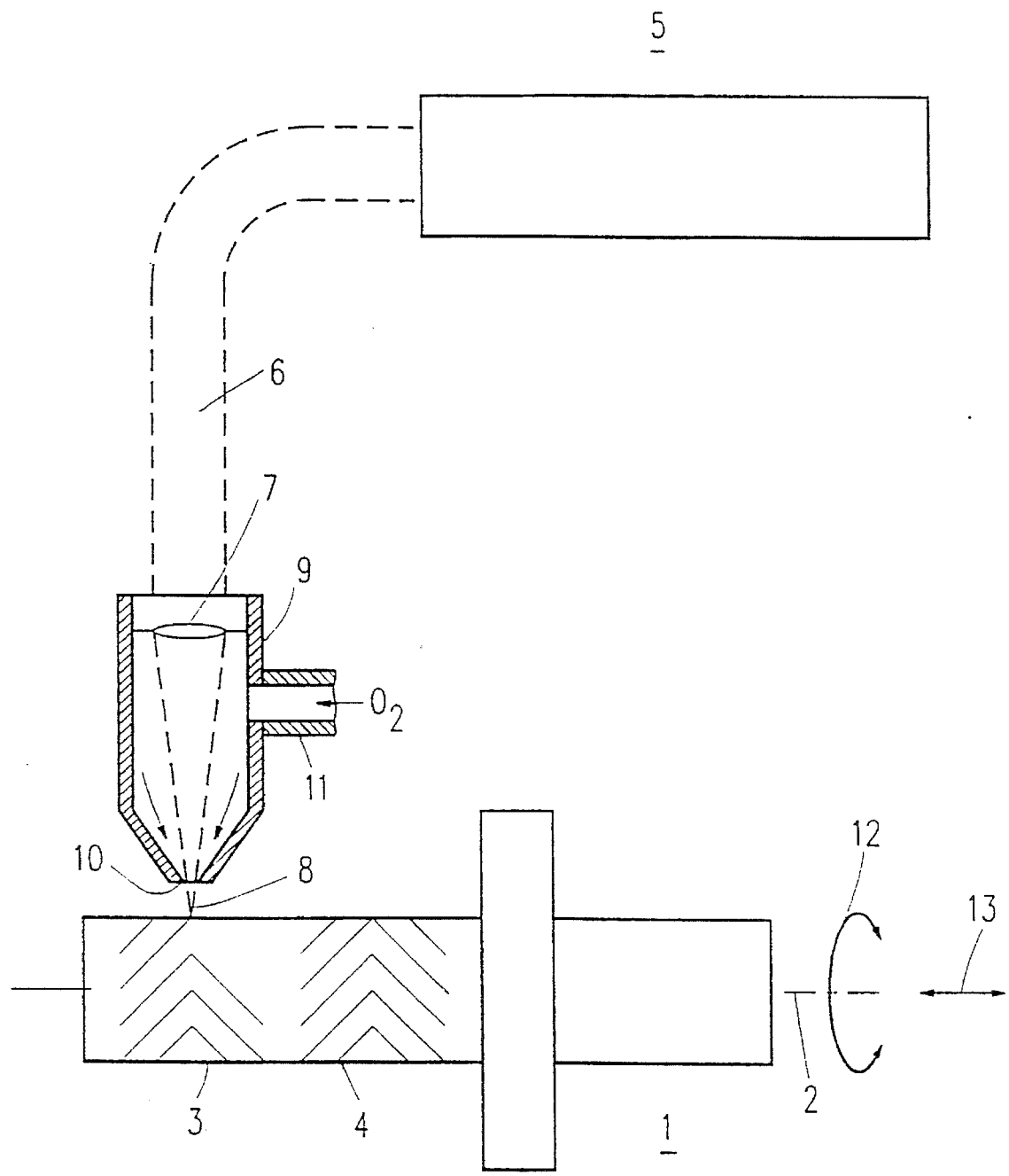

METHOD OF GENERATING A PATTERN IN THE SURFACE OF A WORKPIECE

This is a continuation of application Ser. No. 08/023,255, filed Feb. 25, 1993.

The invention relates to a method of generating a pattern of depressions in the surface of a workpiece, in particular one made of molybdenum or a molybdenum alloy for rotary-anode X-ray tubes.

DE-OS 39 30 573 discloses a rotary-anode X-ray tube whose anode plate made of tungsten is provided with a pattern of grooves. This pattern of grooves is to lock the anode plate against rotation relative to the rotor spindle supporting it, which spindle is provided with a corresponding pattern of grooves on the shoulder facing the anode plate. These patterns of grooves are manufactured by a photolithographic etching process.

DE-OS 39 00 730 discloses a rotary-anode X-ray tube with a spiral groove bearing. The spiral groove bearing comprises a stationary part connected to the bulb of the tube and a part which rotates together with the anode plate and which surrounds the stationary part. The stationary part is provided with a pattern of spiral grooves which have a width of a few tenths of millimeters and a depth of 0.01 mm to 0.02 mm. A gallium alloy, whose vapour pressure remains low also during operation of the X-ray tube, is present between the bearing parts as a lubricant. The bearing parts are made of molybdenum, because most other metals react chemically with the aggressive gallium alloy.

The pattern of spiral grooves is also manufactured by a photolithographic etching process in which approximately ten process steps are necessary. The manufacture of the spiral groove pattern is expensive as a result. The etchant solutions necessary for it form a considerable environmental impact.

It is an object of the present invention to arrange a process of the kind mentioned in the opening paragraph in such a manner that a smaller environmental impact and/or lower costs are achieved. According to the invention, this object is achieved in that the workpiece is heated spotwise by a laser beam, the heating spot being conducted over the surface in accordance with the pattern of depressions, in that a jet of oxygen is directed at the heating spot, and in that the energy supply to the heating spot is so controlled that the melting temperature of the workpiece material is not reached but the sublimation temperature of the oxide formed by the heating is exceeded.

According to the invention, the material of the workpiece oxidizes in the heating spot and the oxide thus formed sublimates (evaporates), thus leaving a cavity, without the material being melted, because the energy supply is so controlled that the melting temperature is not reached, but the sublimation temperature is exceeded. Melting of the material in the case of molybdenum or molybdenum alloys would require a high thermal power because the melting temperatures are very high (approximately 2600°). On the other hand, bulges would be formed at the edges in the manufacture of grooves, which are undesirable in a spiral groove bearing. According to the invention, by contrast, a comparatively small thermal power is already sufficient because molybdenum oxidizes and sublimates at approximately 800° already.

Heating is effected by means of a laser arrangement. The use of lasers for material processing has been known per se for a long time. It is also known in cutting or separating processes to direct a jet of oxygen at the point heated by the laser (see e.g. "Laser welding, cutting and surface treatment", The Welding Institute, England 1984, pp. 28–32). According to this publication, the supply of oxygen or compressed air to the heated spot (the laser spot) effects on the one hand an increased power density in the laser spot and on the other hand the removal of the molten material from the separation spot by blowing. The energy density is increased in that the material oxidizes in the laser spot. This substantially increases the absorption of the laser radiation (at least at the wavelength generated by a $CO_2$ laser), so that a better thermal coupling to the laser beam is obtained. Moreover, the oxidation is a thermal reaction which releases additional energy.

Whereas in the known method, therefore, the oxygen supply in combination with the thermal power in the laser spot serves to melt the material, such melting is undesirable according to the invention. A correspondingly smaller quantity of energy is supplied for this reason, so that only an oxidation and a subsequent sublimation (evaporation) can take place. The invention is accordingly applicable to workpieces made of molybdenum or a molybdenum alloy whose melting point lies above the oxidation temperature and above the sublimation temperature of its oxide.

The impact on the environment is comparatively small because only the material removed through sublimation is evolved as a gaseous oxide. The manufacture proceeds more quickly than etching and requires lower investments.

The invention will be explained below in more detail with reference to the drawing.

The workpiece 1 to be treated is made of molybdenum and is a part of a spiral groove bearing of a rotary-anode X-ray tube, for example, in accordance with DE-OS 39 00 730. It is rotationally symmetrical in relation to the axis 2 and has two zones 3 and 4 with a fishbone-type groove pattern at its surface. This groove pattern is shown complete in zone 4 while it is yet to be completed in zone 3. The grooves of such a pattern have a width of, for example, 0.22 mm and a depth of 0.015 mm. The interspacing between two adjacent grooves should be as wide as the grooves themselves (0.22 mm). The drawing shows the dimensional relations diagrammatically only and not true to scale.

The grooves are generated by a diagrammatically pictured laser 5, preferably a Nd:YAG laser. Preferably, this laser is continuously operated (CW operation), so that the temperature remains constant through time and space. The laser beam is directed through a waveguide 6 shown in broken lines or by means of a suitable deflection mirror to an objective 7 which focuses the beam on the surface of the workpiece, so that a laser spot with a dimension of approximately 0.3 mm is generated perpendicular to the surface of the workpiece. The power density in this spot should be as homogeneous as possible, which is achieved most satisfactorily when the laser is operated in a $TEM_{00}$ mode, or at least in a low mode order.

When the laser 5 is operated with a power of approximately 200–300 W, practically no changes are caused at the surface of the workpiece 1 under atmospheric conditions. However, when an oxygen (or compressed air) jet is aimed at the spot heated by the laser, an oxidation and a subsequent sublimation take place at the same electrical power, whereby the generated oxide evaporates, leaving a cavity. For this purpose, the focusing objective is fastened in a nozzle 9 in a manner known per se, which nozzle has an opening 10 through which the laser beam travels onto the workpiece while it is simultaneously enveloped in an oxygen jet which is fed through a lateral inlet 11. The quantity of molybdenum oxidized and sublimated by the oxygen supply initially increases strongly with the oxygen flowrate. Above a certain oxygen flowrate, however, this quantity changes only slightly. The oxygen flow rate should accordingly be so chosen that it lies above this value. Given a distance of the nozzle opening to the workpiece of 3.5 mm and a diameter of the nozzle opening of 3.5 mm, a suitable value is 15 l oxygen per minute.

The groove depth depends not only on the oxygen flowrate, the size and intensity distribution of the laser spot and the laser power, but also on the speed which which the laser spot is advanced over the surface of the workpiece. This "advance" takes place in that the workpiece 1 is inserted into a digitally controlled CNC machine (not shown) which is capable of rotating the workpiece 1 about its axis of symmetry 2 (arrow 12) and which in addition is capable of moving the workpiece in axial direction (arrow 13). When these movements are carded out simultaneously, one of the grooves of the fishbone pattern can be generated. A suitable advancing speed for a groove depth of 0.015 mm and a groove width of 0.22 mm and a laser power of around 200 W lies at approximately 360 mm/min.

The groove width can be varied through variation of the size of the laser spot, while its depth can be changed through variation of the laser power or the advancing speed. Different geometric patterns of depressions can be achieved when the workpiece is moved in a different manner relative to the laser spot, for which purpose the programming of the CNC machine in which the workpiece 1 is clamped should be changed correspondingly.

The grooves manufactured in this manner show no lateral bulges of any kind and have a small peak-to-valley depth in the groove base and a surface which is smoothed to a high degree.

I claim:

1. A method of generating a pattern of depressions in the surface of a generally cylindrical workpiece for use as a groove bearing in a rotary anode X-ray tube, said cylindrical workpiece being constituted of molybdenum or of a molybdenum alloy having a melting point at a first temperature and having an oxide having a sublimation point at a second temperature below the first temperature, comprising the steps:

a) providing a laser beam source, b) directing the laser beam at the cylindrical surface of the workpiece to form a heated spot at a third temperature lying below the first temperature but above the second temperature, c) moving the heated spot over the surface of the workpiece to trace the pattern of depressions to be formed, d) while carrying out step c), directing a jet of oxygen at the heat ed spot, e) step d) being carried out while controlling the energy of the laser beam such that only a local region of the workpiece oxidizes and the oxide sublimates to form the pattern of depressions.

2. The method of claim 1, wherein the first temperature is approximately 2600° C., and the second temperature is approximately 800° C.

3. The method of claim 2, wherein the depressions are spiral grooves in the molybdenum or molybdenum alloy workpiece having a width of a few tenths of millimeters and a depth of 0.01–0.02 mm.

4. The method of claim 2, wherein step e) is carried out to form depressions in the form of grooves without bulges at the groove edges by rotating the workpiece relative to the jet of oxygen.

* * * * *